(12) United States Patent
Suzuki et al.

(10) Patent No.: US 8,742,056 B2
(45) Date of Patent: Jun. 3, 2014

(54) SOLID RESOL-TYPE PHENOLIC RESIN AND METHOD OF MANUFACTURING THE SAME

(75) Inventors: Yuji Suzuki, Tokyo (JP); Kazuya Kitagawa, Tokyo (JP)

(73) Assignee: Sumitomo Bakelite Co., Ltd., Tokyo (JP)

(*) Notice: Subject to any disclaimer, the term of this patent is extended or adjusted under 35 U.S.C. 154(b) by 0 days.

(21) Appl. No.: 13/636,195

(22) PCT Filed: Mar. 14, 2011

(86) PCT No.: PCT/JP2011/001462
§ 371 (c)(1),
(2), (4) Date: Sep. 20, 2012

(87) PCT Pub. No.: WO2011/118147
PCT Pub. Date: Sep. 29, 2011

(65) Prior Publication Data
US 2013/0018163 A1 Jan. 17, 2013

(30) Foreign Application Priority Data

Mar. 25, 2010 (JP) ................................. 2010-070122

(51) Int. Cl.
*C08G 8/04* (2006.01)
(52) U.S. Cl.
USPC .............................. 528/165; 528/86; 528/147
(58) Field of Classification Search
USPC ................................................. 528/165, 147
See application file for complete search history.

(56) References Cited

FOREIGN PATENT DOCUMENTS

| JP | 61-044914 A | 3/1986 | |
|---|---|---|---|
| JP | 62-034948 A | 2/1987 | |
| JP | 05-148334 A | 6/1993 | |
| JP | 06-184405 A | 7/1994 | |
| JP | 06-206961 A | 7/1994 | |
| JP | 2006-016489 | * 1/2006 | ............... C08G 8/04 |
| JP | 2006-016489 A | 1/2006 | |
| JP | 2007-099789 A | 4/2007 | |
| JP | 2009-242472 A | 10/2009 | |

OTHER PUBLICATIONS

International Search Report for PCT/JP2011/001462, mailing date of Jun. 14, 2011.

* cited by examiner

*Primary Examiner* — Shane Fang
(74) *Attorney, Agent, or Firm* — Westerman, Hattori, Daniels & Adrian, LLP

(57) ABSTRACT

Disclosed is a solid resol-type phenolic resin having: methylol groups and dimethylene ether bonds, as functional groups bound to phenolic nuclei; a content of methylol group, per 1 mol of the phenolic nuclei, of 0.8 mol or more and 1.3 mol or less; a content of dimethylene ether bond, per 1 mol of the phenolic nuclei, of 0.1 mol or less; a weight-average molecular weight of a tetrahydrofuran-soluble fraction, measured by gel permeation chromatography (GPC), of 800 or larger and 4,000 or smaller; and a content of mononuclear phenolic compound of 10% by weight or less.

10 Claims, 1 Drawing Sheet

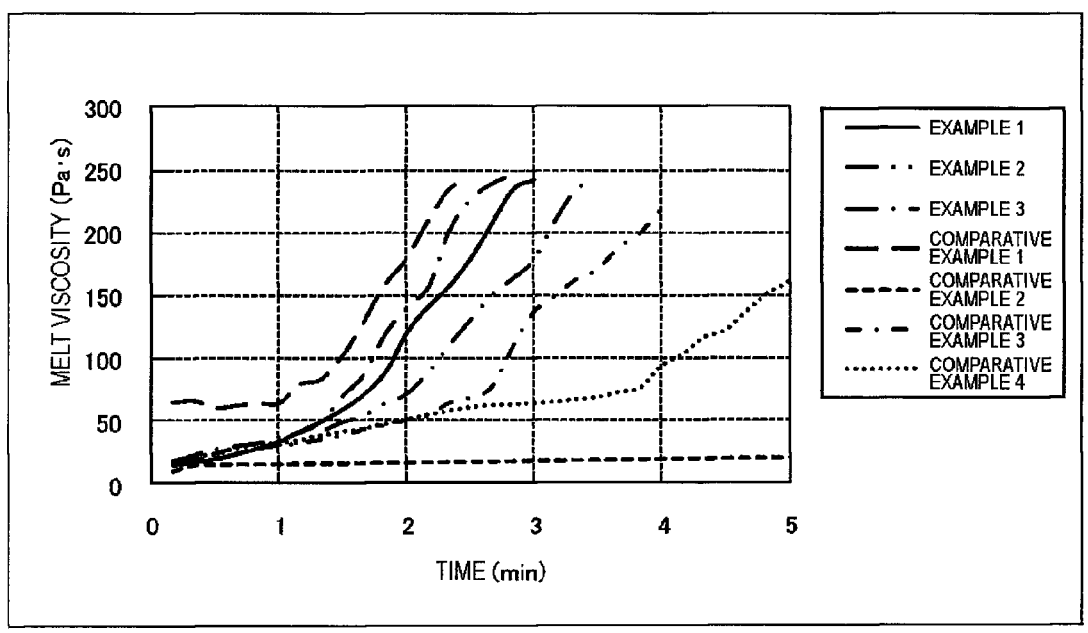

SOLID RESOL-TYPE PHENOLIC RESIN AND METHOD OF MANUFACTURING THE SAME

TECHNICAL FIELD

The present invention relates to a solid resol-type phenolic resin and a method of manufacturing the same.

BACKGROUND ART

In the technical field of solid resol-type phenolic resin, it is a common practice to adjust the number of dimethylene ether bonds in the resin to 0.5 mol or more per 1 mol of phenolic compound, aiming at optimizing the gelation time so as to stabilize the production.

The aspect is also discussed in Patent Document 1.

RELATED DOCUMENT

Patent Document

[Patent Document 1] Japanese Laid-Open Patent Publication No. 2007-99789

DISCLOSURE OF THE INVENTION

Problems to be Solved by the Invention

According to findings of the present inventors, the solid resol-type phenolic resin described in the above-mentioned Patent Document was suffering from slow curing time, as a result of adjustment of the number of the dimethylene ether bonds in the resin to 0.5 mol or more, since the dimethylene ether bonds transform to produce methylene bridges only after once being decomposed in the process of curing.

Means for Solving the Problems

The present invention will be understood as follows:
[1] A solid resol-type phenolic resin having:
   methylol groups and dimethylene ether bonds, as functional groups bound to phenolic nuclei;
   a content of methylol group, per 1 mol of the phenolic nuclei, of 0.8 mol or more and 1.3 mol or less;
   a content of dimethylene ether bond, per 1 mol of the phenolic nuclei, of 0.1 mol or less;
   a weight-average molecular weight of a tetrahydrofuran-soluble fraction, measured by gel permeation chromatography (GPC), of 800 or larger and 4,000 or smaller; and
   a content of mononuclear phenolic compound of 10% by weight or less.
[2] The solid resol-type phenolic resin according to [1], containing no nitrogen component.
[3] The solid resol-type phenolic resin according to [1] or [2], further having methylene groups as the functional group, and a content of methylene group, per 1 mol of the phenolic nuclei, of 0.6 mol or more and 0.9 mol or less.
[4] The solid resol-type phenolic resin according to any one of [1] to [3],
   having an initial viscosity at 110° C. of 20 Pa·s or lower.
[5] The solid resol-type phenolic resin according to any one of [1] to [4],
   showing a thickening time, over which ICI viscosity at 110° C. reaches 200 Pa·s, of 3.5 minutes or shorter.
[6] The solid resol-type phenolic resin according to any one of [1] to [5], used as a phenolic resin-based molding material.
[7] A method of manufacturing the solid resol-type phenolic resin described in any one of [1] to [6],
   allowing a reaction between a phenolic compound and an aldehyde compound to proceed using an alkaline catalyst.
[8] The method of manufacturing the solid resol-type phenolic resin according to [7], wherein the reaction is proceeded at pH 10 or above.
[9] The method of manufacturing the solid resol-type phenolic resin according to [7] or [8],
   wherein the alkaline catalyst contains no nitrogen atom.
[10] The method of manufacturing the solid resol-type phenolic resin according to any one of [7] to [9],
   wherein the reaction is proceeded at 100° C. or below.

Effect of the Invention

According to the present invention, a solid resol-type phenolic resin characterized by rapid curing speed and low melt viscosity may be provided.

BRIEF DESCRIPTION OF THE DRAWING

The above and other objects, features and advantages of the present invention will be more apparent from the following description of certain preferred embodiments taken in conjunction with the accompanying drawing, in which:
FIG. 1 is a drawing illustrating melt viscosity of solid resol-type phenolic resins obtained in Examples and Comparative Examples.

DESCRIPTION OF EMBODIMENTS

The present invention will be detailed below.
<Solid Resol-Type Phenolic Resin>
The solid resol-type phenolic resin of the present invention has:
   methylol groups and dimethylene ether bonds, as functional groups bound to phenolic nuclei;
   a content of methylol group, per 1 mol of the phenolic nuclei, of 0.8 mol or more and 1.3 mol or less;
   a content of dimethylene ether bond, per 1 mol of the phenolic nuclei, of 0.1 mol or less;
   a weight-average molecular weight of a tetrahydrofuran-soluble fraction, measured by gel permeation chromatography (GPC), of 800 or larger and 4,000 or smaller; and
   a content of mononuclear phenolic compound of 10% by weight or less.
The individual components will be explained below.
While the lower limit of the content of methylol group is not specifically limited, it is preferably 0.8 mol or more per 1 mol of the phenolic nuclei, and more preferably 0.9 mol or more. On the other hand, while the upper limit of the content of methylol group is again not specifically limited, it is preferably 1.3 mol or less per 1 mol of the phenolic nuclei, and more preferably 1.2 mol or less.
By adjusting the content of methylol group in the above-described ranges, the solid resol-type phenolic resin excellent in the rapid curability may be obtained.
While the lower limit value of the content of dimethylene ether bond is not specifically limited, it is 0 mol or more per 1 mol of the phenolic nuclei. While the upper limit value of the content of dimethylene ether bond is again not specifically limited, it is 0.1 mol or less per 1 mol of the phenolic nuclei, and more preferably 0.05 mol or less.
By adjusting the content of dimethylene ether bond in the above-described ranges, the solid resol-type phenolic resin excellent in the rapid curability may be obtained.

The solid resol-type phenolic resin of the present invention may have methylene groups bound to the phenolic nuclei.

While the lower limit value of the content of methylene group is not specifically limited, it is 0.6 mol or more per 1 mol of the phenolic nuclei, and more preferably 0.7 mol or more. While the upper limit value of the content of methylene group is again not specifically limited, it is 0.9 mol or less per 1 mol of phenolic nuclei, and more preferably 0.8 mol or less.

By adjusting the content of methylene group in the above-described ranges, the solid resol-type phenolic resin which is ready to solidify may be obtained.

The contents of methylol group, dimethylene ether bond and methylene group in the solid resol-type phenolic resin of the present invention may be measured by proton nuclear magnetic resonance (1H-NMR). In 1H-NMR, the solid resol-type phenolic resin is acetylated using acetic anhydride, and the contents of phenolic nuclei, methylol group, dimethylene ether bond and methylene group in the resin are determined from a 1H-NMR spectrum of the acetylated product. An apparatus used herein is "JNM-AL300" (frequency=300 MHz) from JEOL Ltd. While the method of measurement described in the above is directed to an exemplary solid resol-type phenolic resin derived from phenol and formaldehyde, also resins derived from other phenolic compound and aldehyde compound may basically be measured according to the same principle.

The lower limit value of the weight-average molecular weight of the solid resol-type phenolic resin of the present invention is preferably 800 or larger, and more preferably 1,200 or larger, on the other hand, the upper limit value is preferably 4,000 or smaller, and more preferably 3,000 or smaller.

By adjusting the weight-average molecular weight in the above-described ranges, the solid resol-type phenolic resin characterized by low melting point and low melt viscosity may be obtained.

The weight-average molecular weight of the solid resol-type phenolic resin of the present invention is determined by gel permeation chromatography (GPC) using a tetrahydrofuran (THF)-soluble fraction.

While the content of mononuclear phenolic compound in relation to total 100% by weight of solid resol-type phenolic resin of the present invention is not specifically limited, it is 0% by weight or more and 10% by weight or less, more preferably 7% by weight or less, and more preferably 5% by weight or less. The mononuclear phenolic compound herein means a compound having one benzene ring in the molecule thereof, and examples of which include unreacted phenolic compound monomer, monomethylolphenolic compound, dimethylolphenolic compound, and trimethylolphenolic compound.

By adjusting the content of mononuclear phenolic compound in the above-described ranges, the solid resol-type phenolic resin excellent in readiness of solidification may be obtained.

The content of mononuclear phenolic compound in the present invention may be determined based on the molecular weight distribution measured in the gel permeation chromatography (GPC) using the tetrahydrofuran (THF)-soluble fraction, by the area method according to which ratio of an area ascribable to the mononuclear component, in relation to the total area, is expressed by percentage.

The solid resol-type phenolic resin of the present invention preferably contains no nitrogen atom. The expression of "contains no nitrogen atom" herein allows inevitable incorporation of nitrogen atom in the process of manufacturing.

The solid resol-type phenolic resin of the present invention may be reduced in the melt viscosity, by virtue of absence of nitrogen atoms. In addition, the absence of nitrogen atom is also beneficial in terms of preventing nitrogen from emitting in the gas form in the process of curing, or from remaining as a residual component.

The expression of "contains no nitrogen atom" also means that the solid resol-type phenolic resin of the present invention is manufactured using nitrogen-free materials. Using the solid resol-type phenolic resin of the present invention, various components for various applications, such as molding material, may be obtained. Note that any components composed of the solid resol-type phenolic resin of the present invention and any nitrogen-containing component later added thereto, in particular those composed of the solid resol-type phenolic resin of the present invention as combined with any nitrogen-containing component intended for use as molding materials, are not excluded from the scope of the present invention.

The nitrogen content is measured using a total nitrogen analyzer (SUMIGRAPH NC-900, from Sumika Chemical Analysis Service, Ltd.).

While the initial viscosity (ICI viscosity at 110° C., at the start time of measurement) of the solid resol-type phenolic resin of the present invention is not specifically limited, the lower limit value is preferably 1 Pa·s or higher, more preferably 5 Pa·s or higher, and on the other hand, the upper limit value is preferably 20 Pa·s or lower, more preferably 15 Pa·s or lower.

By adjusting the initial viscosity of the solid resol-type phenolic resin of the present invention in the above-described ranges, the solid resol-type phenolic resin having a low melt viscosity may be obtained.

While the thickening time (a time over which the ICI viscosity at 110° C. reaches 200 Pa·s) of the solid resol-type phenolic resin of the present invention is not specifically limited, the lower limit value is preferably 1 minute or longer, more preferably 1.5 minutes or longer after the start of the measurement, on the other hand, the upper limit value is preferably 3.5 minutes or shorter, more preferably 3 minutes or shorter after the start of the measurement.

By adjusting the thickening time of the solid resol-type phenolic resin of the present invention in the above-described ranges, the solid resol-type phenolic resin excellent in the rapid curability may be obtained.

The present inventors investigated into the conventional solid resol-type phenolic resins, and reached the findings (1) to (3) below.

(1) Slow Reaction Rate during Curing

Known conventional method of manufacturing the solid resol-type phenolic resin is such as using a salt compound such as zinc acetate as a catalyst, or by allowing the methylol group to react under a neutral and low-water-content condition, so as to increase the ratio of dimethylene ether bond, to thereby increase the molecular weight, and allowing the solidification to proceed while suppressing changes in the viscosity and molecular weight during the dehydration reaction. The solid resol-type phenolic resin obtainable by the method might have a low viscosity, but has been suffering from slow reaction rate during curing, since the curing mechanism is such that the dimethylene ether bonds transform to produce methylene bridges only after once being decomposed. Although methods of using an acid or a base as a curing accelerator have been proposed aiming at solving the problem, the catalyst is anticipated to remain and affect the cured article, to thereby restrict the range of application.

(2) Hard to Solidify

The solid resol-type phenolic resin solely composed of a methylol component and methylene bridges is known to be hard to solidify, due to high polarity and high hygroscopicity of the methylol component. A known method of solving the drawbacks was to increase the molecular weight so as to increase the hydrophobicity and to assist the solidification, but the method resulted in difficulty in the molding due to high melting point and high viscosity. Another known method is such as using a high-molecular-weight phenolic compound, such as novolac, bisphenol F or bisphenol A, as a starting material, so as to elevate the melting point to thereby assist the solidification. These phenolic compound have, however, high melt viscosity, and have only a limited number of methylol groups bound thereto, so that they were hard to attain a sufficient level of crosslinking density in the process of curing. These drawbacks of high polarity, high hygroscopicity, and consequent difficulty in solidification of the methylol component might have been avoidable by adding various inorganic or organic fillers, so as to suppress stickiness and to thereby apparently assist solidification. The method is, however, anticipated to strongly restrict the workability and design, when the phenolic resin is planned to be used in the form of composite.

(3) high Melt Viscosity

The solid resol resin has been known to give a hydrophobic solid resol-type phenolic resin, by incorporating a nitrogen component into the resin skeleton, by using a large amount of basic catalyst described in the above such as ammonia, or primary, secondary and tertiary amines, or by modifying it using an aromatic amine such as aniline. The method might be successful in elevating the melting point and might make the resin more readily solidified, by virtue of crosslinking of the nitrogen-containing compound with the phenolic resin, but may considerably increase the viscosity.

In addition, these nitrogen-containing compounds may be emitted in the gas form in the process of curing, or may remain in the resin as a residual component. The both may be causative of hygienic and odor-related problems. In addition, the nitrogen-containing compound used for composing electric or electronic material is anticipated to induce corrosion.

Considering the problems (1) to (3) described in the above, the present inventors found out that a solid resol-type phenolic resin characterized by rapid curing rate and low melt viscosity may be obtained, by appropriately controlling the molarity of the dimethylene ether bond, the weight-average molecular weight, and the value of the weight of mononuclear phenolic compound.

Since the solid resol-type phenolic resin of the present invention is excellent in the rapid curability as described in the above, efficiency of manufacturing may be improved. In addition, since the solid resol-type phenolic resin of the present invention has a low melt viscosity, so that a large amount of source material, such as phenolic compound, may be loaded at a time, and thereby the productivity may be improved.

The solid resol-type phenolic resin of the present invention may be used as a phenolic resin-based molding material. In addition, the solid resol-type phenolic resin of the present invention has excellent thermal resistance and mechanical performances, and may therefore be used, after being mixed with various types of filler, in a wide variety of applications including a molding material, friction material, grindstone and casting; and also including insulating and structural materials for electronic/electric appliances, architectural and automotive applications.

<Method of Manufacturing Solid Resol-Type Phenolic Resin>

A method of manufacturing the solid resol-type phenolic resin of the present invention includes the steps below:

(a) a step of allowing a reaction between a phenolic compound and an aldehyde compound to proceed using an alkaline catalyst, to thereby obtain a resol-type phenolic resin which has:

methylol groups and dimethylene ether bonds, as functional groups bound to phenolic nuclei;

a content of dimethylene ether bond, per 1 mol of the phenolic nuclei, of 0.1 mol or less;

a weight-average molecular weight of a tetrahydrofuran-soluble fraction, measured by gel permeation chromatography (GPC), of 800 or larger and 4,000 or smaller; and a content of mononuclear phenolic compound of 10% by weight or less;

(b) a step of neutralizing the obtained resol-type phenolic resin using an acidic catalyst; and (c) a step of solidifying the neutralized resol-type phenolic resin through dehydration and drying.

The method will be explained step-by-step below.

First, the step (a) will be explained. In the step (a), a phenolic compound and an aldehyde compound are allowed to react, with the aid of an alkaline catalyst.

The phenolic compound used in the step (a) is not specifically limited, wherein examples of which include phenol, orthocresol, metacresol, paracresol, 2,3-xylenol, 2,4-xylenol, 2,5-xylenol, 2,6-xylenol, 3,5-xylenol, 2,3,5-trimethylphenol, 2-ethylphenol, 4-ethylphenol, 2-isopropylphenol, 4-isopropylphenol, n-butylphenol, isobutylphenol, Cert-butylphenol, hexylphenol, octylphenol, nonylphenol, phenylphenol, benzylphenol, cumylphenol, allylphenol, catechol, resorcin, hydroquinone, 1-naphthol, 2-naphthol, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, and 2,7-dihydroxynaphthalene. Among them, phenol which is economically advantageous is particularly preferable.

The aldehyde compound used in the step (a) is not specifically limited, wherein examples of which include formaldehyde, paraformaldehyde, benzaldehyde, salicylaldehyde, parahydroxybenzaldehyde, acetaldehyde, propylaldehyde, butylaldehyde, 1-naphthylaldehyde and 2-naphthylaldehyde. These aldehyde compounds used herein may be a single species, or an arbitrary combination of two or more species.

Among these compounds, formaldehyde is preferable since it is well reactive with phenol, or ortho-substituted phenolic compound, industrially mass-produced, and is therefore available at low cost.

The alkaline catalyst used in the step (a) is preferably free from nitrogen component, examples of which include sodium hydroxide, lithium hydroxide, potassium hydroxide; oxides and hydroxides of alkali earth metals such as calcium, magnesium and barium; and alkaline substances such as sodium carbonate.

In the step (a), the phenolic compound and the aldehyde compound are allowed to react with the aid of the alkaline catalyst, to thereby adjust the content of dimethylene ether bond, per 1 mol of phenolic nuclei, to 0.1 mol or less. In this way, the resol-type phenolic resin excellent in rapid curability may be obtained.

As for reaction conditions in the step (a), pH is preferably 10 or above, more preferably 11 or above, without special limitation, on the other hand, preferably 13 or below, more preferably 12 or below, again without special limitation.

Reaction temperature in the step (a) is preferably 60° C. or above, more preferably 70° C. or above, without special limitation, on the other hand, preferably 100° C. or below, more preferably 90° C. or below, again without special limitation. The reaction temperature may be prevented from elevating, by adding the aldehyde compound to the phenolic compound, wherein the mode of addition is not limited thereto, and may alternatively be a batch addition so long as the reaction temperature does not exceed the values described in the above.

By adjusting the reaction conditions in the step (a) in the above-described ranges, the content of dimethylene ether bond, per 1 mol of phenolic nuclei, may be adjusted to 0.1 mol or less. In addition, by adjusting pH to the lower limit value or above, the content of low-nuclei such as mononucleus and dinucleus may be reduced, and on the other hand, by adjusting pH to the upper limit value or below, a disproportionation reaction of formaldehyde may be suppressed.

The reaction time may suitably be determined depending on species of starting materials, ratio of mixing, amount of use and species of catalyst, and reaction conditions, without special limitation.

While the amount of addition of alkaline catalyst is not specifically limited, it is preferably 10 to 50 wt %, per 100 wt % of phenolic compound. By adjusting the amount of addition of alkaline catalyst in the above-described range, the pH may more readily be controlled, and excellent curability may be obtained (note that, "to" will include the lower limit value and the upper limit value, unless otherwise specifically noted, hereinafter).

In the step (a), molar ratio of the aldehyde compound relative to 1 mol of phenolic compound is preferably 1.0 mol to 3.0 mol, and more preferably 1.2 mol to 2.5 mol.

By adjusting the content of aldehyde compound in the above-described range, the content of methylol group, per 1 mol of phenolic nuclei, is adjustable to 0.8 mol or more.

It is now alternatively possible to obtain the solid resol-type phenolic resin, by allowing the phenolic compound and the aldehyde compound with the aid of the acidic catalyst to thereby obtain a novolac resin, and then by converting the novolac resin into resol. However, the solid resol-type phenolic resin derived from novolac has a content of methylol group, per 1 mol of phenolic compound, of only as small as 0.5 mol or around, and cannot be raised to as much as 0.8 mol. For this reason, the solid resol-type phenolic resin derived from novolac was often found to cure slowly.

In contrast, the solid resol-type phenolic resin of the present invention is derived from the resol, and therefore contains a sufficient amount of methylol groups. Accordingly, the solid resol-type phenolic resin of the present invention is excellent in rapid curability.

By adjusting the reaction time to a predetermined length or shorter, the weight-average molecular weight may be reduced.

By determining the reaction time while assuming, as the end point, a point of time at which a predetermined level of viscosity is achieved, the methylene content is adjustable to a predetermined value.

Next, the step (b) will be explained. In the step (b), the obtained resol-type phenolic resin is neutralized using an acidic catalyst.

Species of the acidic catalyst used in the step (b) is not specifically limited, and examples of which include organic carboxylic acids such as oxalic acid and acetic acid; organic sulfonic acids such as benzenesulfonic acid, paratoluenesulfonic acid and methanesulfonic acid; and inorganic acids such as hydrochloric acid and sulfuric acid. Among them, the inorganic acids are preferable. By using the inorganic acids, in particular the gelation time is adjustable to an appropriate level. While the amount of use of the acidic catalyst described in the above is not specifically limited, it is preferable to adjust pH of the reaction system to pH 2 to 8, and more preferably to pH4 to 7. By adjusting pH of the reaction system in the above-described ranges, the gelation time is adjustable to an appropriate level, and thereby the manufacturing may be stabilized.

After the neutralization, salts produced by the neutralization may be removed by washing with water. By the washing with water, the monomer content may be reduced, which is effective enough for solidification.

In both of the step (a) and the step (b), while a solvent used for the reaction is preferably water, as is generally practiced, the reaction may alternatively be proceeded in an organic solvent, and still alternatively in a non-aqueous system using a non-polar solvent. The organic solvent is not specifically limited, and examples of which include alcohols, ketones and aromatic compounds. The alcohols are exemplified by methanol, ethanol, propyl alcohol, ethylene glycol, diethylene glycol, triethylene glycol and glycerin; the ketones are exemplified by acetone and methyl ethyl ketone; and the aromatic compounds are exemplified by toluene and xylene. The solvent used herein may be a single species, or an arbitrary combination of two or more species.

In the method of manufacturing of the present invention, the step (b) may be succeeded by the drying step (c) which includes a dehydration process for reducing the water content in the resol-type phenolic resin to 5% by weight or less. In this process, melting point of the solid resol-type phenolic resin of the present invention is preferably 60° C. or above and 110° C. or below, and more preferably 70° C. or above and 90° C. or below. By adjusting the melting point in the above-described ranges, the resol-type phenolic resin will be given in the form of solid (solid resol-type phenolic resin), which is less sticky and low in the melt viscosity.

The melting point is measured conforming to JIS K0064.

The step (c) will be explained below.

It is generally known that the resol-type phenolic resin is lowered in the melting point, if water is contained therein. The process of obtaining the solid resol-type phenolic resin includes the dehydration process, since the water inhibits the solidification, wherein the solidification process in this case requires a higher level of preciseness than in the process of synthesizing a liquid resol-type phenolic resin. The dehydration process, succeeding the step (b) described in the above in the method of manufacturing of the present invention, is preferably conducted under reduced pressure as is generally practiced, or may be conducted under normal pressure. For example, degree of vacuum in the dehydration process under reduced pressure is preferably 110 torr or below, and more preferably 80 torr or below. By adjusting the degree of vacuum in the above-described range, dehydration time may be shortened, and the resultant solid resol-type phenolic resin may be stable and have a small variation in the resin properties. This operation also successfully reduces the water content of the solid resol-type phenolic resin to 5% by weight or less. By adjusting the water content of the solid resol-type phenolic resin in the above-described range, a particularly labor consuming production step is now omissible. More specifically, the resin may be solidified in a desirable manner in the process of manufacturing, while being successfully prevented from solidifying during transport or crushing, by virtue of the melting point which is kept without being lowered. In the drying step, not only water, but also the organic solvent may be removed.

While the water may thoroughly be removed by the methods described in the above, the step may be combined with a step of using a known dehydration device for further removal. For example, water is removable by using a vacuum dryer or a film evaporator.

In the method of manufacturing according to the present invention, nitrogen component is not used as the source material or the like, in the steps (a) to (c). The resultant solid resol-type phenolic resin of the present invention, therefore, does not contain nitrogen atoms.

In this way, the solid resol-type phenolic resin of this embodiment is obtained.

EXAMPLES

The present invention will be detailed below referring to Examples, without limiting the present invention. Note that "part(s)" hereinbelow means "part(s) by weight", and "%" means "% by weight", unless otherwise specifically noted.

Example 1

1,000 parts of phenol and 1,000 parts of water were mixed, and pH of the mixture was adjusted to approximately 11, using 420 parts of a 50% aqueous sodium hydroxide solution. To the mixture, 1,640 parts of 37% formalin (F/P molar ratio=1.9) was added at 85° C., and the mixture was allowed to react at 85° C. until the viscosity reached 0.5 poise. Upon completion of the reaction, 300 parts of acetone was added to the mixture, the reaction system was cooled, and then neutralized with 25% sulfuric acid so as to adjust pH to approximately 6.8, the mixture was allowed to stand still so as to separate it into an aqueous layer and a resin layer, and the aqueous layer was discarded. The reaction system was added again with 1000 parts of water, the mixture was stirred, then allowed to stand still, and then the aqueous layer was discarded again. The thus-obtained liquid resol resin was solidified by drying it in a vacuum dryer at 60° C. for 30 minutes, to thereby obtain a solid resol-type phenolic resin (referred to as "KR-11", hereinafter).

Example 2

The solid resol-type phenolic resin used herein was a mixture of "KR-11", and PR-53529 from SUMITOMO BAKELITE CO. LTD. preliminarily removed with a large molecular weight component by molecular weight fractionation. The molecular weight fractionation of PR-53529 was conducted by gel filtration chromatography, using Sephadex LH-20 (from GE Healthcare Japan), tetrahydrofuran (THF) as an eluent, at a flow rate of 100 ml/h, with a column length of 1,000 mm, and an inner diameter of column of 30 mm. The eluate was collected using a fraction collector, and fractionated according to the molecular weight component based on results of detection by an RI detector.

Example 3

The solid resol-type phenolic resin was obtained by a reaction and a procedure of solidification similar to those in Example 1, except that a mixed aqueous solution of a 50% aqueous sodium hydroxide solution and a 25% aqueous ammonia solution was used, in place of the 50% aqueous sodium hydroxide solution.

Comparative Example 1

PR-51723 from SUMITOMO BAKELITE CO. LTD. was used as the solid resol-type phenolic resin.

Comparative Example 2

PR-53529 from SUMITOMO BAKELITE CO. LTD. was used as the solid resol-type phenolic resin.

Comparative Examples 3 and 4

A mixture of "KR-11" and PR-53529 from SUMITOMO BAKELITE CO. LTD. was used as the solid resol-type phenolic resin.

Comparative Example 5

1,000 parts of phenol and 1,000 parts of water were mixed, and pH of the mixture was adjusted to approximately 11, using 420 parts of a 50% aqueous calcium hydroxide solution. To the mixture, 1,035 parts of 37% formalin (F/P molar ratio=1.2) was added at 80° C., and the mixture was allowed to react for 2 hours. Upon completion of the reaction, 300 parts of acetone was added to the mixture, the reaction system was cooled, and then neutralized with 25% sulfuric acid so as to adjust pH to approximately 5.0, the mixture was allowed to stand still so as to separate it into an aqueous layer and a resin layer, and the aqueous layer was discarded. The resin layer was distilled under reduced pressure, to thereby obtain a liquid resol resin. The thus-obtained liquid resol resin was dried in a vacuum dryer at 60° C., only to fail in solidification of the resol resin. For this reason, none of the initial viscosity, the thickening time and the melting point were evaluated in Comparative Example 5.

Contents of methylol group, dimethylene ether bond and methylene group, weight-average molecular weight, content of the mononuclear phenolic compound, and nitrogen content of the solid resol-type phenolic resins obtained in Examples and Comparative Examples were measured. Results are shown in Table 1.

TABLE 1

|  |  | Example 1 | Example 2 | Example 3 | Comparative Example 1 PR-51723 | Comparative Example 2 PR-53529 | Comparative Example 3 | Comparative Example 4 | Comparative Example 5 |
|---|---|---|---|---|---|---|---|---|---|
| Solidification |  | Yes | Yes | Yes | Yes | Yes | Yes | Yes | No |
| Methylene | mol | 0.84 | 0.76 | 0.78 | 0.54 | 0.37 | 0.75 | 0.60 | 0.53 |
| Methylol | mol | 1.11 | 0.96 | 1.15 | 0.81 | 0.26 | 0.94 | 0.68 | 0.67 |
| Ether | mol | 0.00 | 0.10 | <0.10 | — | 0.56 | 0.11 | 0.28 | 0.00 |
| Mw |  | 1377 | 3981 | 1816 | 4798 | 30611 | 9718 | 30071 | 1017 |
| Mononuclear phenolic compound | wt % | 2.7 | 6.6 | 2.9 | 7.9 | 10.5 | 6.6 | 8.5 | 14.1 |

TABLE 1-continued

|  |  | Example 1 | Example 2 | Example 3 | Comparative Example 1 PR-51723 | Comparative Example 2 PR-53529 | Comparative Example 3 | Comparative Example 4 | Comparative Example 5 |
|---|---|---|---|---|---|---|---|---|---|
| N content | wt % | 0.0 | 0.0 | 0.6 | 1.1 | 0.0 | 0.0 | 0.0 | 0.0 |
| Initial viscosity | Pa·s | 14 | 16 | 19 | 65 | 10 | 16 | 16 | — |
| Thickening time | min | 2.7 | 3.2 | 2.3 | 2.2 | 64.0 | 3.8 | 5.5 | — |
| Melting point | °C. | 85 | 72 | 81 | 85 | 61 | 72 | 66 | — |

(Contents of Methylol Group, Dimethylene Ether Bond and Methylene Group)

Contents of methylol group, dimethylene ether bond and methylene group in the solid resol-type phenolic resin of the present invention were measured by 1H-NMR.

Measurement conditions of 1H-NMR are as follow:

the solid resol-type phenolic resin was acetylated using acetic anhydride, and the contents of phenolic nuclei, methylol group, dimethylene ether bond and methylene group, per 1 mol of the phenolic nuclei, in the resin were determined from a 1H-NMR spectrum of the acetylated sample.

An apparatus used herein was "JNM-AL300" (frequency=300 MHz) from JEOL Ltd.

Note that, in Example 3, N-methylene group and dimethylene ether group give peaks almost at the same position in 1H-NMR analysis. It was confirmed from the 1H-NMR analysis that the total content of N-methylene group and dimethylene ether group was 0.1 mol or less. Accordingly, the amount of bonding of dimethylene ether group in Example 3 was understood to be smaller than the total content of N-methylene group and dimethylene ether group measured by 1H-NMR analysis.

(Weight-Average Molecular Weight)

The weight-average molecular weight of the solid resol-type phenolic resin was measured by gel permeation chromatography (GPC) using the tetrahydrofuran (THF)-soluble fraction. Measurement conditions of GPC are as follow:

apparatus: HLC-8320 (from TOSOH CORPORATION),
detector: RI,
column: a single column of TSK-GEL G1000H (from TOSOH CORPORATION) and two columns of TSK-GEL G2000H (from TOSOH CORPORATION), connected in series in this order,
temperature: 40° C.,
solvent: THF,
flow rate: 1.0 ml/min, and
sample: 1 wt % sample, 50 µl per injection.

(Content of Mononuclear Phenolic Compound)

The content of mononuclear phenolic compound was determined based on the molecular weight distribution measured in the gel permeation chromatography (GPC) using the tetrahydrofuran (THF)-soluble fraction, by the area method according to which ratio of an area ascribable to the mononuclear phenolic compound component, in relation to the total area, is expressed by percentage.

(Nitrogen Content)

The nitrogen content was measured using a total nitrogen analyzer (SUMIGRAPH NC-900, from Sumika Chemical Analysis Service, Ltd.).

In the total nitrogen analyzer, a solid or liquid sample was completely combusted under the presence of an oxidative catalyst, while circulating oxygen gas, and the combustion gas was homogenized by circulation. A part of the combustion gas was sampled, the nitrogen content thereof was reduced to $N_2$, and the individual components were separated, detected and quantified by gas chromatograph coupled with a thermal conductivity detector.

Melt viscosity of the solid resol-type phenolic resins obtained in Examples and Comparative Examples was measured. Results are shown in FIG. 1.

(Melt Viscosity)

The melt viscosity at 110° C. was measured using a cone-plate viscometer CV-1S (from TOA Industry Inc.). Using the viscometer, initial viscosity (Pa·s) and thickening time (min) were measured.

The initial viscosity herein was defined as a viscosity observed 20 seconds after time $t_0$ at which the control temperature reached 110° C. On the other hand, the thickening time was defined as a difference between time $t_0$ at which the control temperature reached 110° C., and time at which torque reached 200 Pa·s.

(Melting Point)

Melting point was measured, conforming to JIS K0064.

From the results obtained in the above, the solid resol-type phenolic resins of Examples were found to be rapid in the curing speed and low in the melt viscosity, as compared with Comparative Examples.

This application claims priority right based on Japanese Patent Application No. 2010-70122 filed on Mar. 25, 2010, the entire content of which is incorporated hereinto by reference.

The invention claimed is:

1. A solid resol-type phenolic resin having:
   methylol groups and dimethylene ether bonds, as functional groups bound to phenolic nuclei;
   a content of methylol group, per 1 mol of the phenolic nuclei, of 0.8 mol or more and 1.3 mol or less;
   a content of dimethylene ether bond, per 1 mol of the phenolic nuclei, of 0.1 mol or less;
   a weight-average molecular weight of a tetrahydrofuran-soluble fraction, measured by gel permeation chromatography (GPC), of 800 or larger and 4,000 or smaller; and
   a content of mononuclear phenolic compound of 10% by weight or less.

2. The solid resol-type phenolic resin according to claim 1, containing no nitrogen component.

3. The solid resol-type phenolic resin according to claim 1, further having methylene groups as the functional group; and
   a content of methylene group, per 1 mol of the phenolic nuclei, of 0.6 mol or more and 0.9 mol or less.

4. The solid resol-type phenolic resin according to claim 1, having an initial viscosity at 110° C. of 20 Pa·s or lower.

5. The solid resol-type phenolic resin according to claim 1, showing a thickening time, over which ICI viscosity at 110° C. reaches 200 Pa·s, of 3.5 minutes or shorter.

6. The solid resol-type phenolic resin according to claim 1, used as a phenolic resin-based molding material.

7. A method of manufacturing the solid resol-type phenolic resin described in claim 1,
   allowing a reaction between a phenolic compound and an aldehyde compound to proceed using an alkaline catalyst.

8. The method of manufacturing the solid resol-type phenolic resin according to claim 7,
   wherein the reaction is proceeded at pH 10 or above.

9. The method of manufacturing the solid resol-type phenolic resin according to claim 7,
   wherein the alkaline catalyst contains no nitrogen atom.

10. The method of manufacturing the solid resol-type phenolic resin according to claim 7,
   wherein the reaction is proceeded at 100° C. or below.

* * * * *